US012799808B2

(12) United States Patent
Inaoka et al.

(10) Patent No.: US 12,799,808 B2
(45) Date of Patent: Nov. 17, 2026

(54) GLASS BODY

(71) Applicant: Nippon Sheet Glass Company, Limited, Tokyo (JP)

(72) Inventors: Daisuke Inaoka, Tokyo (JP); Tatsuhiro Nakazawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 977 days.

(21) Appl. No.: 17/776,694

(22) PCT Filed: Nov. 16, 2020

(86) PCT No.: PCT/JP2020/042639

§ 371 (c)(1),
(2) Date: May 13, 2022

(87) PCT Pub. No.: WO2021/095885

PCT Pub. Date: May 20, 2021

(65) Prior Publication Data

US 2022/0396989 A1 Dec. 15, 2022

(30) Foreign Application Priority Data

Nov. 15, 2019 (JP) ................................ 2019-206833

(51) Int. Cl.
*E06B 3/67* (2006.01)
*E06B 3/66* (2006.01)
*E06B 3/663* (2006.01)

(52) U.S. Cl.
CPC .......... *E06B 3/6715* (2013.01); *E06B 3/6612* (2013.01); *E06B 3/66304* (2013.01)

(58) Field of Classification Search
CPC .. E06B 3/6715; E06B 3/6612; E06B 3/66304; C03C 17/366; C03C 17/3644; C03C 17/3681; C03C 17/36
See application file for complete search history.

(56) References Cited

U.S. PATENT DOCUMENTS

2013/0122281 A1 5/2013 Hakuta et al.
2015/0343884 A1 12/2015 Rousselet et al.
2017/0114588 A1 4/2017 Fukuda et al.
2018/0111448 A1 4/2018 Rousselet et al.
(Continued)

FOREIGN PATENT DOCUMENTS

CN 102933990 A 2/2013
CN 104703794 A 6/2015
(Continued)

OTHER PUBLICATIONS

International Search Report for PCT/JP2020/042639 mailed on Jan. 19, 2021.
(Continued)

*Primary Examiner* — Laura A Auer
(74) *Attorney, Agent, or Firm* — Birch, Stewart, Kolasch & Birch, LLP

(57) ABSTRACT

A glass body according to the present invention includes a first glass plate including a first surface and a second surface, and a first film region including a first Low-E film that is formed on at least a portion of at least one of the first surface and the second surface of the first glass plate, and the first film region has radio wave transmittance.

17 Claims, 9 Drawing Sheets

(56) References Cited

U.S. PATENT DOCUMENTS

| | | | | |
|---|---|---|---|---|
| 2021/0129495 | A1 | 5/2021 | Asai et al. | |
| 2021/0256230 | A1* | 8/2021 | Holtstiege | G06K 19/07773 |

FOREIGN PATENT DOCUMENTS

| | | | |
|---|---|---|---|
| CN | 108480447 | A | 2/2017 |
| CN | 108515752 | A | 9/2018 |
| JP | 5-50548 | A | 3/1993 |
| JP | 6-40752 | A | 2/1994 |
| JP | 8-175848 | A | 7/1996 |
| JP | 3732349 | B2 | 1/2006 |
| JP | 2011-102217 | A | 5/2011 |
| JP | 2012-206920 | A | 10/2012 |
| JP | 2016-506308 | A | 3/2016 |
| WO | WO 2015/025963 | A1 | 2/2015 |
| WO | WO 2019/189042 | A1 | 10/2019 |

OTHER PUBLICATIONS

Written Opinion of the International Searching Authority for PCT/JP2020/042639 mailed on Jan. 19, 2021.

Chinese Office Action and Search Report for Chinese Application No. 202080078995.7 dated Sep. 2, 2023, with an English translation.

Extended European Search Report for European Application No. 20887898.3, dated Jan. 4, 2024.

Japanese Office Action for Japanese Application No. 2021-556198, dated May 21, 2024, with English translation.

Chinese Office Action for Chinese Application No. 202080078995.7, dated Mar. 21, 2024, with English translation.

Japanese Office Action for Japanese Application No. 2021-556198, dated Oct. 15, 2024, with English translation.

* cited by examiner

WORKING EXAMPLE 3

WORKING EXAMPLE 4

WORKING EXAMPLE 5

GLASS BODY

TECHNICAL FIELD

The present invention relates to a glass body.

BACKGROUND ART

In recent years, a glass body having a Low-E film (low-emissivity film) through which visible light passes and which reflects infrared rays has been proposed as window glass for a vehicle or a building. The purpose is to improve the heat insulating property of the window glass by using such a glass body.

CITATION LIST

Patent Literature

Patent Literature 1: Japanese Patent No. 3732349

SUMMARY OF INVENTION

Technical Problem

However, the above-mentioned glass body is problematic in that it has a low radio wave transmittance and it is difficult to transmit and receive radio waves using, for example, mobile phone radio waves. The present invention has been made to solve this problem, and an object thereof is to provide a glass body including a low-emissivity film and having radio wave transmittance.

Solution to Problem

1. A glass body including:
   a first glass plate including a first surface and a second surface; and
   a first film region including a first Low-E film formed on at least a portion of at least one of the first surface and the second surface of the first glass plate,
   in which the first film region has radio wave transmittance.
2. The glass body according to item 1,
   in which the first film region includes the first Low-E film, which is composed of a plurality of non-continuous islands separated by a plurality of gaps.
3. The glass body according to item 2,
   in which the first Low-E film includes a base layer laminated on the first surface of the first glass plate and a shield layer laminated on the base layer, and
   at the gaps, the base layer laminated on the first surface of the first glass plate is laminated and the base layer is exposed.
4. The glass body according to item 2,
   in which the first Low-E film includes a base layer laminated on the first surface of the first glass plate and a shield layer laminated on the base layer, and
   the first surface of the first glass plate is exposed at the gaps.
5. The glass body according to any one of items 2 to 4, in which the maximum dimension of the islands of the first Low-E film, which are partitioned by the gaps, is 100 μm to 5 mm.
6. The glass body according to item 2 or 5, in which the width of the gaps is 1 to 100 μm.

7. The glass body according to any one of items 1 to 6, in which the first glass plate further includes a second film region that is formed on the surface on which the first film region is formed, the second film region including a second Low-E film and not having radio wave transmittance.
8. The glass body according to item 7, in which the second film region is formed so as to surround the first film region.
9. The multilayer glass panel according to item 7 or 8, in which the second Low-E film is made of the same material as the first Low-E film, and is continuous, with no gaps.
10. The glass body according to any one of items 1 to 9, further including:
    a second glass plate including a first surface and a second surface; and
    a spacer that is arranged between the first glass plate and the second glass plate and forms a gap layer between the two glass plates,
    in which the second surface of the first glass plate and the first surface of the second glass plate are arranged so as to face each other via the gap layer.
11. The glass body according to item 10, in which the second surface of the second glass plate includes an antenna region in which an antenna is arranged.
12. The glass body according to item 11, in which in a view from a direction perpendicular to the first glass plate and the second glass plate, the antenna region is formed with the same size as the region corresponding to the first film region, or is formed smaller than the corresponding region.
13. The glass body according to item 11, in which in a view from a direction perpendicular to the first glass plate and the second glass plate, the antenna region is formed with the same size as the region corresponding to the first film region, or at least a side thereof is located inward from an edge portion of the corresponding region.
14. The glass body according to item 13, in which 10 mm or more of the at least one side of the antenna region is located 10 mm or more inward from the edge portion of the corresponding region.
15. The glass body according to any one of items 10 to 14, in which the first film region is formed larger than a rectangle with a side that is 33 mm.
16. The glass body according to any one of items 10 to 15, in which the first film region is formed on the second surface of the first glass plate.
17. The glass body according to any one of items 10 to 15, in which the first film region is formed on the first surface of the second glass plate.
18. The glass body according to any one of items 1 to 17, in which the first Low-E film contains a transparent conductive oxide.
19. The glass body according to item 18, in which the transparent conductive oxide has a film thickness of 50 to 1000 nm.
20. The glass body according to any one of items 1 to 17, in which the first Low-E film contains a shield layer containing silver as a main component.
21. The glass body according to item 20, in which the shield layer has a film thickness of 5 to 20 nm.
22. The glass body according to any one of items 1 to 21, in which in the first Low-E film, two shield layers containing silver as a main component are laminated.

Advantageous Effects of the Invention

The glass body according to the present invention has radio wave transmittance while having a low-radiation film.

DESCRIPTION OF EMBODIMENTS

Figure 1:
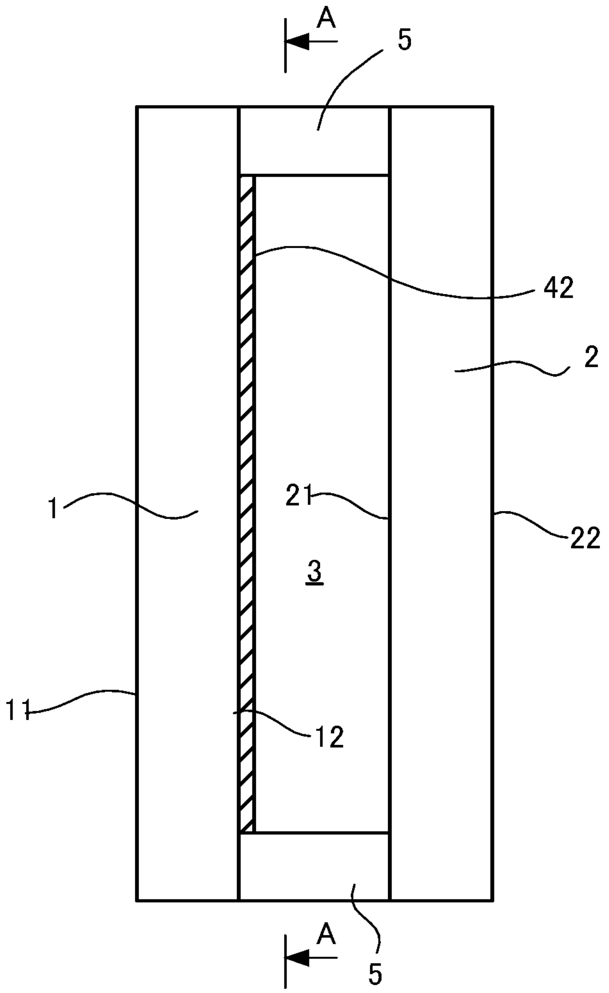
FIG. 1 is a cross-sectional view showing an example in which a glass body according to the present invention is applied to a multilayer glass panel.
Figure 2:
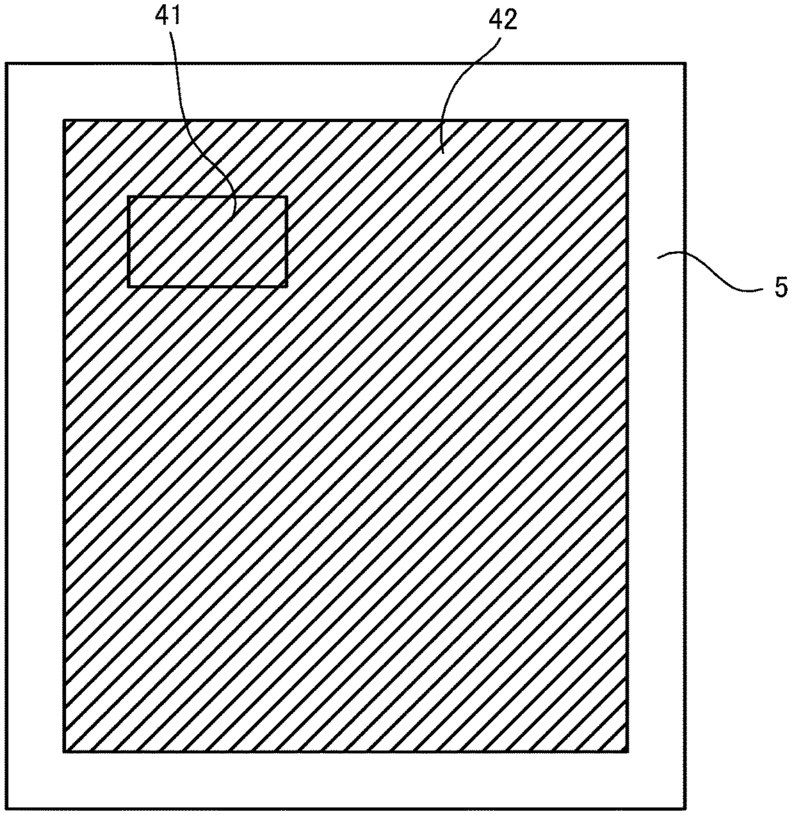
FIG. 2 is a diagram taken along line A-A in FIG. 1 and viewed in the direction of the arrows.

Hereinafter, an embodiment in which the glass body according to the present invention is applied to a multilayer glass panel will be described with reference to the drawings. FIG. 1 is a cross-sectional view of this multilayer glass panel, and FIG. 2 is a view taken along line A-A of FIG. 1 and viewed in the direction of the arrows. This multilayer glass panel can be used for various purposes, for example, as window glass for a building, window glass for a vehicle such as an automobile, an aircraft, a ship, or a train, or the like. Although not shown in the drawings, various antennas (not shown) for receiving radio waves are arranged on an indoor (vehicle interior) side with respect to the multilayer glass. Note that the antenna can also be attached to a surface on the indoor (vehicle interior) side of the multilayer glass.

1. Overview of Multilayer Glass Panel

As shown in FIG. 1, the multilayer glass panel according to the present embodiment has two glass plates having substantially the same rectangular outer shape, that is, a first glass plate 1 and a second glass plate 2, and these glass plates 1 and 2 are coupled to each other by a spacer 5 arranged on the peripheral edges thereof. The spacer 5 forms a void layer 3 between the two glass plates 1 and 2. Also, in the first glass plate 1, a first film region 41 having a first Low-E film and a second film region 42 having a second Low-E film are formed on the surface facing the void layer 3 side. Note that if an antenna for transmitting and receiving radio waves is installed on a surface on the indoor side of the multilayer glass panel, the first film region 41 may be formed at a location that is the installation position of the antenna, but this position is not particularly limited. Also, although not shown in the drawings, the void layer 3 is hermetically sealed by a sealing material arranged on the outer side relative to the spacer 5. Hereinafter, each member will be described.

2. First Glass Plate

The first glass plate 1 has a first surface 11 and a second surface 12, and the second surface 12 is arranged so as to face the void layer 3 side. Then, as described above, the first film region 41 and the second film region 42 are formed on the second surface 12. Also, there is no particular limitation on the material of the first glass plate 1, and a known glass plate can be used. For example, various glass plates such as heat ray absorbing glass, clear glass, green glass, UV green glass, and soda lime glass can be used. Although there is no particular limitation on the thickness of the first glass plate, the thickness is preferably, for example, 2 to 15 mm, and more preferably 2.5 to 8 mm.

3. Second Glass Plate

The second glass plate 2 has a first surface 21 and a second surface 22, and the first surface 21 is arranged so as to face the void layer 3 side. The material and thickness of the second glass plate 2 can be the same as those of the first glass plate 1. Note that the thicknesses of the first glass plate 1 and the second glass plate 2 may be the same or different.

4. Low-E Film (Low-Emissivity Film)

4-1. Overview of Low-E Film

As shown in FIG. 2, the first film region 41 is formed in a rectangular shape and is formed in the upper right portion of the first glass plate 1. Specifically, the first film region 41 is arranged at an interval from the upper side and the lateral side of the first glass plate 1. Also, the second film region 42 is formed in a region other than the region in which the first film region 41 is formed on the second surface 12 of the first glass plate 1.

There is no particular limitation on the size of the first film region film 41, and for example, the length in the vertical direction can be 50 to 500 mm and the length in the horizontal direction can be 50 to 500 mm. By applying a partial first film region, the film formation cost can be suppressed, and the deterioration of heat shielding and heat insulating properties can be suppressed. Also, the length from the upper side of the first glass plate 1 to the first film region 41 can be, for example, 10 to 150 mm, and the length from the lateral side of the first glass plate 1 to the first film region 41 can be, for example, 10 to 150 mm. This makes it easier for radio waves emitted from an antenna to reach the entire indoor region, and makes it easier to install antenna wiring.

4-2. Second Film Region

Next, the configuration of the second film region 42 will be described. There is no particular limitation on the configuration of the second film region 42, and a known Low-E film can be applied.

The second film region 42 is formed by a second Low-E film. The second Low-E film is, for example, a continuous film including a shield layer that shields from radio waves. This film has, for example, a structure in which a dielectric layer, a shield layer, a sacrificial layer, and a dielectric layer are laminated in the stated order starting from the second surface 12 side of the first glass plate 1. In other words, this Low-E film has a first laminated structure including a shield layer, a sacrificial layer arranged in contact with the shield layer on the surface of the shield layer opposite to the main plane side, and a pair of dielectric layers that sandwich the shield layer and the sacrificial layer. Also, this Low-E film may include two or more shield layers, which enables a design according to which the U value (thermal transmittance) of the multilayer glass panel is made smaller. In this case, the second Low-E film 42 can have a structure in which, for example, a dielectric layer, a shield layer, a sacrificial layer, a dielectric layer, a shield layer, a sacrificial layer, and a dielectric layer are laminated in the stated order starting from the second surface 12 side of the first glass plate 1. In other words, the second Low-E film may include a first laminated structure of two or more shield layers, and in this case, the dielectric layer sandwiched between the sacrificial layer and the shield layer can be shared by two first laminated structures.

Note that the dielectric layer located directly below each shield layer (on the first glass plate side) functions as a base layer in some cases, and the dielectric layer laminated on the shield layer via the sacrificial layer functions as an antireflection layer in some cases.

The dielectric layer, the shield layer, and the sacrificial layer may each be one layer made of one material, or a laminate of two or more layers made of mutually different materials.

The pair of dielectric layers sandwiching the shield layer and the sacrificial layer in the first laminated structure may be made of the same material or mutually different materials.

If the number of shield layers is n, the number of dielectric layers sandwiching the shield layer is n+1 or more, and therefore the second Low-E film including the shield layers is normally composed of a number of layers that is 2n+1 or more.

The shield layer can be, for example, a metal layer containing silver. Hereinafter, the metal layer containing silver will be referred to as an Ag layer. The Ag layer may be a layer containing Ag as a main component and may be a layer composed of Ag. In the present specification, a "main component" is a component having the highest content in the layer, and the content thereof is usually 50 wt % or more, and is preferably 70 wt % or more, more preferably 80 wt % or more, and even more preferably 90 wt % or more. Instead of Ag, a material obtained by doping Ag with a metal such as palladium, gold, indium, zinc, tin, aluminum, or copper can be used in the shield layer.

Also, the shield layer can be, for example, a transparent conductive oxide. In particular, a layer containing fluorine-doped tin oxide ($SnO_2$:F) as a main component can be used as a transparent conductive oxide.

If the second Low-E film contains at least one shield layer and the shield layer is a metal layer, the thickness per layer of the shield layer is preferably, for example, 5 to 20 nm. If the thickness of the shield layer is smaller than 5 nm, the continuity of the shield layer cannot be maintained, and there is a possibility that a sufficient low-emissivity performance will not be obtained. On the other hand, if the thickness exceeds 20 nm, for example, as architectural glass, there is a risk that the color of the shield layer will be noticeable, and a desirable appearance will not be obtained.

The sacrificial layer is, for example, a layer containing at least one selected from titanium, zinc, nickel, chromium, a zinc/aluminum alloy, niobium, stainless steel, and alloys and oxides thereof as a main component. The thickness of the sacrificial layer is, for example, 0.1 to 5 nm, and preferably 0.5 to 3 nm.

The dielectric layer is, for example, a layer containing an oxide or a nitride as a main component, and a more specific example of such a dielectric layer is a layer containing at least one selected from oxides and nitrides of silicon, aluminum, zinc, tin, titanium, indium, and niobium as a main component. Also, if a plurality of shield layers are provided, the dielectric layer, which is the base layer directly under the second shield layer (on the side away from the first glass plate 1), preferably contains zinc oxide as a main component. The thickness of the dielectric layer is, for example, 8 to 120 nm, and preferably 15 to 85 nm.

There is no limitation on the method for forming the shield layer, the sacrificial layer and the dielectric layer, and a known thin film forming method can be used. For example, these layers can be formed through sputtering. That is, the second Low-E film including the shield layer can be formed through, for example, sputtering. The dielectric layer composed of oxides or nitrides can be formed, for example, through reactive sputtering, which is a kind of sputtering. The sacrificial layer is a layer necessary for forming a dielectric layer on the shield layer through reactive sputtering (a layer that prevents oxidation of the shield layer by oxidizing itself during reactive sputtering), and the name "sacrificial layer" is well known to those skilled in the art.

Another example of the second Low-E film is a laminated film containing a transparent conductive oxide layer. This film has, for example, a second laminated structure in which a base layer and a transparent conductive oxide layer are laminated in the stated order starting from the second surface 12 side of the first glass plate 1. In other words, this Low-E film has a second laminated structure including a transparent conductive oxide layer and a base layer sandwiching the transparent conductive oxide layer. The second Low-E film may contain two or more transparent conductive oxide layers.

The base layer and the transparent conductive oxide layer may each be one layer composed of one material or a laminate of two or more layers composed of mutually different materials.

The base layer can be, for example, a layer containing at least one selected from oxides of zinc and tin as a main component, or a layer containing at least one selected from oxides, nitrides, and oxynitrides of silicon and aluminum as a main component. The base layer suppresses the movement of alkali metal ions such as sodium ions contained in the glass plate to the transparent conductive oxide layer, whereby deterioration of the function of the oxide layer is suppressed. The thickness of the base layer is, for example, 5 to 80 nm, and preferably 10 to 50 nm. The base layer may be composed of two or more layers having mutually different refractive indexes, and in this case, the reflected color of the second Low-E film can be brought closer to a neutral color by adjusting the thickness of each layer. In the base layer composed of two or more layers, for example, two layers, it is preferable to use a first base layer containing tin oxide or titanium oxide as a main component, and a second base layer containing silicon oxide or aluminum oxide as a main component are applied in this order from the main plane side of the glass plate.

The transparent conductive oxide layer is a layer containing at least one selected from, for example, indium tin oxide (ITO), zinc aluminum oxide, antimony-doped tin oxide (SnO:Sb) and fluorine-doped tin oxide ($SnO_2$:F) as a main component. The thickness of the transparent conductive oxide layer is, for example, 100 to 500 nm, and preferably 120 to 350 nm.

In a specific example of the second laminated structure, the transparent conductive oxide layer contains a fluorine-doped tin oxide layer having a thickness of 120 nm or more, and an amorphous layer contains a silica layer having a thickness of 15 to 70 nm. A fluorine-doped tin oxide layer having a thickness of 120 nm or more contributes to keeping the emissivity ε of the second Low-E film at a certain value or less. The silica layer having a thickness of 15 nm or more and 70 nm or less can suppress fluctuations in the reflected color of the multilayer glass panel viewed from the indoor space side and the outdoor space side, and can suppress redness in particular.

There is no limitation on the method for forming the base layer, the transparent conductive oxide layer, and the amorphous layer, and a known thin film forming method can be used. For example, these layers can be formed through a CVD method. That is, the second Low-E film containing the transparent conductive oxide layer can be formed through, for example, a CVD method. The formation of the thin film through the CVD method can be carried out "online" in a step of manufacturing the glass plate, and as a more specific example, in a step of manufacturing the glass plate through a float method.

4-3. First Film Region

Next, the first film region 41 will be described. The first film region 41 is a low-emissivity film similarly to the second film region 42, but differs in that it further has radio wave transmittance. Accordingly, radio waves in the frequency range of mobile phones (about 700 MHz to about 28 GHz) can be allowed to pass through. For example, it is possible to allow radio waves for so-called 5G (fifth generation mobile communication), which has a frequency of 3.6 to 28 GHz, to pass through.

Figure 3:
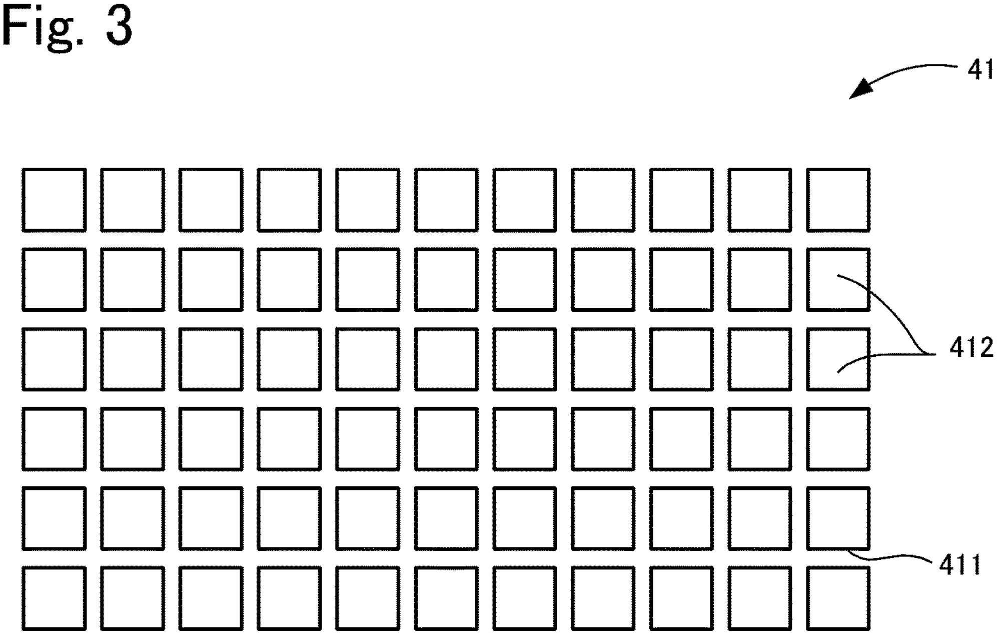
FIG. 3 is a plan view of a first film region.

As shown in FIG. 3, unlike the second film region 42, the first film region 41 is formed by a plurality of islands 412 partitioned by gaps 411, and each island 412 is formed by the first Low-E film. That is, in the first film region 41, the first Low-E film is in a discontinuous state having gaps.

The first Low-E film can be selected from the materials constituting the above-described second Low-E film. At this time, the first Low-E film and the second Low-E film may be made of the same material, or may be made of different materials.

There is no particular limitation on the shape of the island 412, and it is possible to use various shapes such as a circle, a rectangle, a polygonal shape, and an irregular shape. The maximum outer shape of the island 412 is, for example, preferably 100 μm to 5 mm, more preferably 200 μm to 1 mm, and particularly preferably 500 to 900 μm. If this maximum outer shape exceeds 5 mm, there is a risk that radio wave transmittance in the first Low-E film will decrease, which is not preferable. Also, it is more difficult to ensure radio wave transmittance for both a 5G sub-6 band (about 3.6 to about 6 GHz) and millimeter waves (28 GHz band). On the other hand, if the maximum outer shape is smaller than 100 μm, there is a risk that a low emissivity sufficient to exhibit the heat insulating property in the first Low-E film will not be obtained, which is not preferable. Note that the maximum outer shape indicates the distance between two points on the peripheral edge of the island 412 that are the farthest apart.

The width of the gaps 411 is, for example, preferably 1 to 100 μm, more preferably 5 to 50 μm, even more preferably 8 to 30 μm, and particularly preferably 10 to 20 μm. If the width of the gaps 411 exceeds 100 μm, there is a risk that the heat blocking and thermal insulation properties of the first film region 41 will decrease, which is not preferable. On the other hand, if the width of the gaps 411 is 1 μm or more, it becomes easy to form a discontinuous shield layer in the first film region 41, which is preferable.

There is no particular limitation on the method for forming the gaps 411, but for example, after forming a continuous Low-E film such as the second film region 42, a portion of the Low-E film can be removed by a laser to form the gaps 411. Otherwise, the gaps 411 can be formed by partially etching using a mask.

The gaps 411 may be a region where the first glass plate 1 is exposed from between the islands 412, or may be a region in the first Low-E film from which at least the shield layer has been removed. The region from which the shield layer has been removed is, for example, a region in which only the above-described base layer is laminated on the first glass plate 1, and the base layer is exposed to the outside from between the islands 412. Due to the gaps being formed using the base layer in this way, it becomes difficult to visually recognize the difference in appearance between the gaps 411 and the islands 412.

In particular, in order to make it difficult to visually recognize the difference in appearance between the gaps 411 and the islands 412, it is preferable that the surface roughness Rmax of the exposed base layer or the exposed first glass plate 1 is 50 nm or less, more preferably 30 nm or less, and particularly preferably 10 nm or less. Note that the surface roughness Rmax can be defined as the distance from the highest peak to the lowest valley in a portion extracted by a reference length from the cross-sectional curve of the surface of the base layer or the first glass plate 1.

Although there is no particular limitation on the size of the first film region 41, for example, it is preferably larger than a rectangle having one side that is 33 mm, and more preferably larger than a rectangle having one side that is 100 mm. If the first film region 41 is smaller than this size, especially in the case of 5G radio waves, the straightness of the radio waves cannot be guaranteed, and there is a risk that the radio waves will spread and weaken as they proceed.

5. Void Layer

The void layer 3 is formed between both glass plates 1 and 2 by arranging the spacer 5 between the first glass plate 1 and the second glass plate 2. As the spacer 5, a known spacer 5 can be used and can be arranged on the peripheral edges of both glass plates 1 and 2. Also, as a preferable spacer, for example, a spacer in which a desiccant is held in the space inside the spacer can be used. As a result, the dry state of the gas in the void layer 3 can be maintained for a long period of time. Also, a sealing material (not shown) can be arranged further outside the spacer 5 to make the void layer 3 airtight. The void layer 3 can be, for example, 4 to 16 mm, and more preferably 6 to 16 mm. In addition to dry air, the void layer 3 can be filled with an inert gas such as argon or krypton.

6. Antenna

Figure 4:
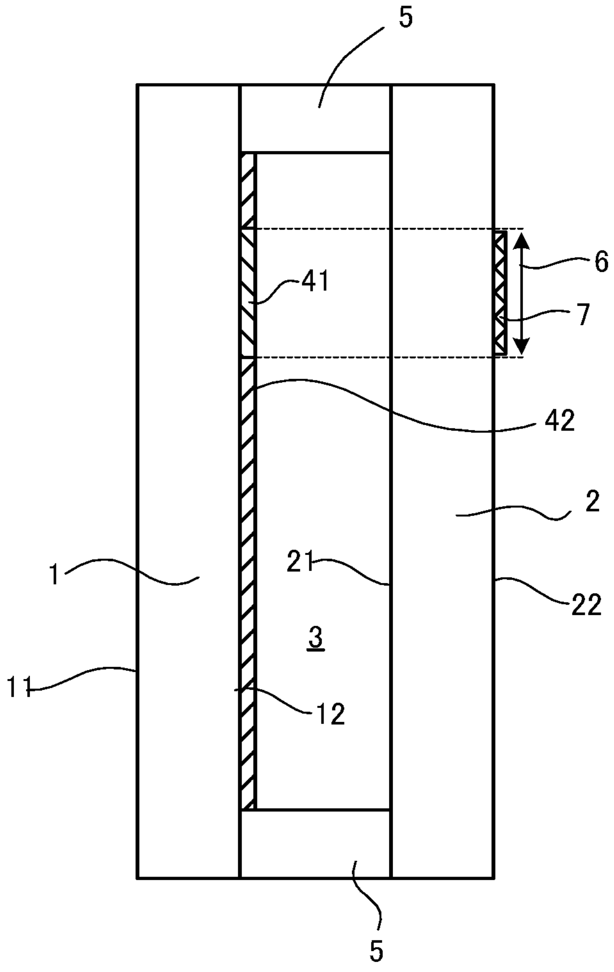
FIG. 4 is a cross-sectional view showing another example of a glass body.

The antenna can be arranged, for example, on the surface facing the indoor side, that is, the second surface 22 of the second glass plate 2. At this time, there is no particular limitation on the position of the antenna region where the antenna is arranged, but it can be arranged as shown in FIG. 4, for example, for 5G radio waves. In the example of FIG. 4, when both glass plates 1 and 2 are viewed from a direction perpendicular to them, the antenna region 7 can be set in a region 6 corresponding to the first film region 41 (hereinafter referred to as "corresponding region") on the second surface 22 of the second glass plate 2. The antenna region 7 may have the same size as the corresponding region 6. It may also be smaller than the corresponding region 6. For example, since 5G radio waves have high straightness, if the antenna is arranged in the region 6 corresponding to the first film region 41 as described above, the sensitivity of transmitting and receiving 5G radio waves in particular can be increased.

Figure 5:
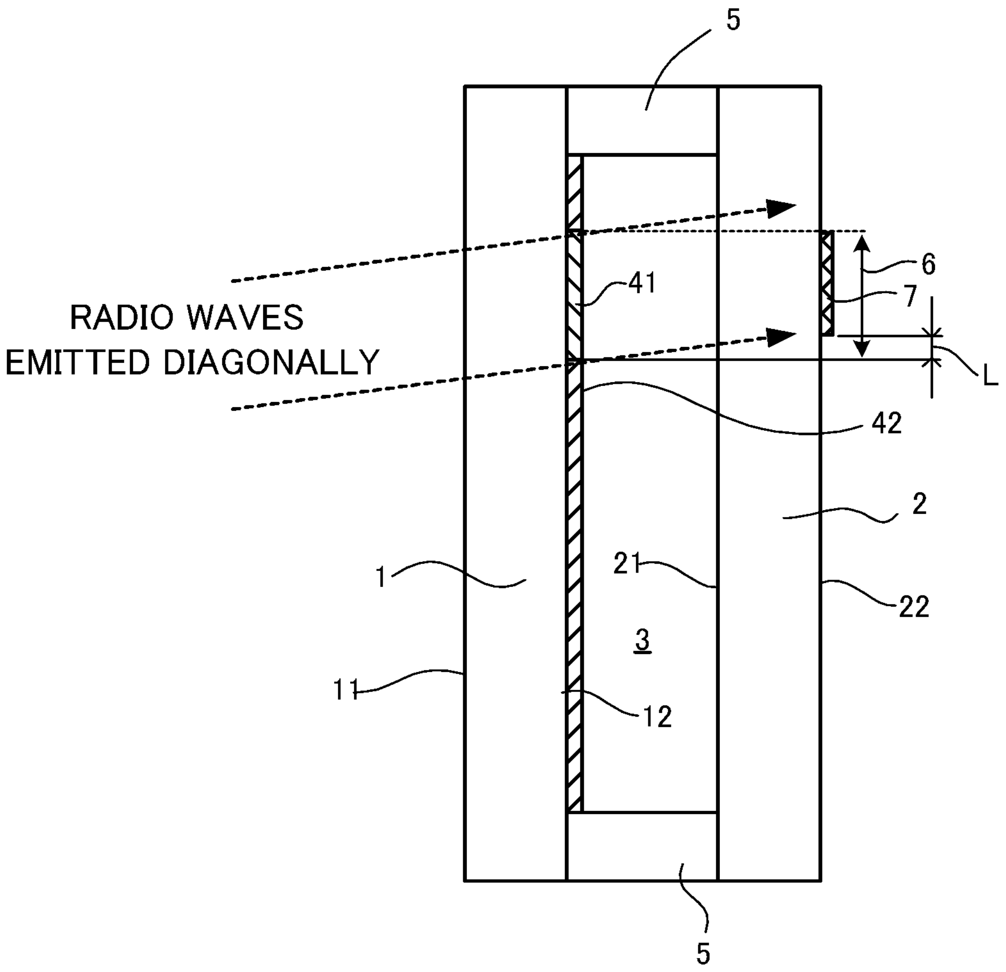
FIG. 5 is a cross-sectional view showing another example of a glass body.
Figure 6A:
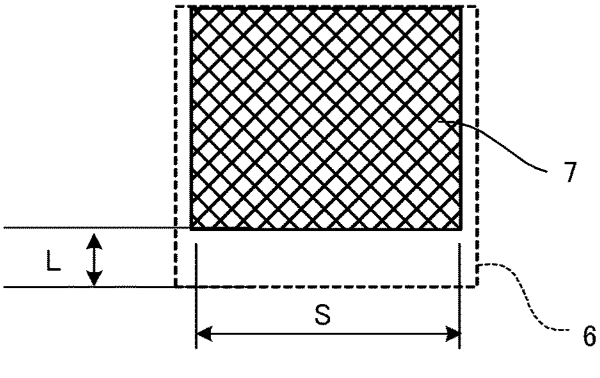
FIG. 6A is a plan view showing a positional relationship between a corresponding region and an antenna region.

Alternatively, as shown in FIGS. 5 and 6A, at least a portion of the antenna region 7 can also be formed so as to located inside of the corresponding region 6. In the examples of FIGS. 5 and 6A, the lower end of the antenna region 7 is on the inner side relative to the lower end of the corresponding region 6 by a distance L. This assumes a case in which, for example, the radio waves enter the glass body diagonally, with consideration given to the straightness of the 5G radio waves. That is, when radio waves having high straightness are incident as shown in FIG. 5, the strength of the radio waves that reach the region extending from the end portion of the corresponding region 6 to the distance L decreases. This distance L is, for example, preferably 10 mm or more, more preferably 20 mm or more, and particularly preferably 50 mm or more. Also, the length S (see FIG. 6A) of the end portion that is located inward by this distance L can be, for example, 10 mm or more.

Figure 6B:
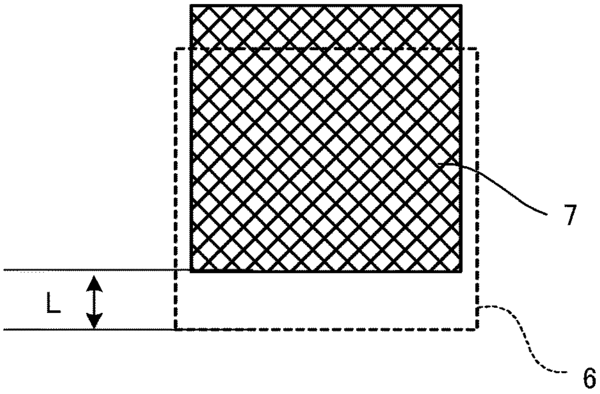
FIG. 6B is a plan view showing the positional relationship between the corresponding region and the antenna region.
Figure 6C:
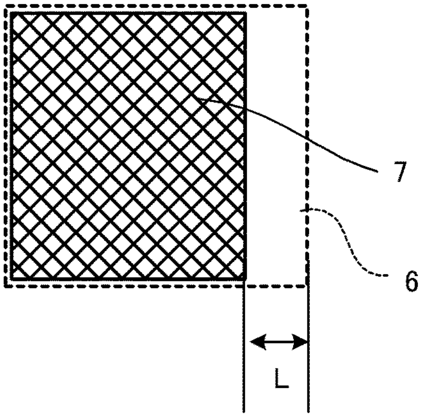
FIG. 6C is a plan view showing the positional relationship between the corresponding region and the antenna region.

A portion of the antenna region 7 may also protrude from the corresponding region 6, as shown in FIG. 6B, for example. Also, as shown in FIG. 6C, the end portion of the antenna region 7 that is spaced apart from the corresponding region 6 by the distance L may be a lateral side of the antenna region 7.

7. Characteristics

According to the multilayer glass panel as described above, the following effects can be obtained.

(1) Since the void layer 3 and the first and second film regions 41 and 42 having the Low-E film are included, a high heat insulating performance can be achieved.

(2) The second film region 42 has high infrared reflectance as a low emissivity film, but for example, has a low transmittance of radio waves having a frequency of 3.7 GHz or higher. Accordingly, for example, in a building or the like provided with a multilayer glass panel having only a continuous Low-E film such as the second film region 42, it is difficult to perform communication through 5G. In contrast to this, if the first film region 41 is provided as in the present embodiment, radio waves such as those described above can be allowed to pass through the gap 411, and therefore radio waves can be transmitted and received to and from the antenna on the indoor (vehicle interior) side. Accordingly, for example, if an antenna is provided at a position corresponding to the first film region 41 on the surface on the indoor (vehicle interior) side of the multilayer glass panel, the performance of transmitting and receiving radio waves can be improved.

(3) Since the narrow gap 411 described above is formed at the boundary between the first film region 41 and the second film region 42, it is possible to make it difficult to visually recognize the boundary between the first film region 41 and the second film region 42.

8. Variation

Although one embodiment of the present invention has been described above, the present invention is not limited to the above-described embodiment, and various modifications can be made without departing from the spirit of the present invention.

In the multilayer glass panel according to the above-described embodiment, the first and second film regions 41 and 42 were formed on the second surface 12 of the first glass plate 1, but they need only be formed on at least one of the first surface 11 and the second surface 12 of the first glass plate 1 and the first surface 21 and the second surface 22 of the second glass plate 2.

The shape, size, and position of the first film region 41 are not particularly limited, and for example, the first film region 41 may be formed on the entire surface of the glass plate 1. That is, it is possible to form only the first film region 41 without forming the second film region 42. Also, the first and second film regions 41 and 42 may not be formed on the entire surface of the glass plate, or may be a portion thereof.

Also, if the Low-E films 41 and 42 are formed on the two surfaces of the glass plate 1, it is desirable to form the Low-E films 41 and 42 respectively at positions facing each other with the glass plate 1 interposed therebetween. This facilitates the transmission of radio waves into an indoor area and improves the radio wave transmittance.

At least one of the first glass plate 1 and the second glass plate 2 can be made of known laminated glass.

In the above-described embodiment, an example in which the glass body according to the present invention is applied to a multilayer glass panel was shown, the glass body of the present invention can also be constituted by only the first glass plate 1 and the first and second film regions 41 and 42. Note that in this case as well, it is possible to form only the first film region 41.

There is no particular limitation on the configuration of the first film region 41, and it is sufficient that the first film region 41 is a low-emissivity film due to including the Low-E film, and has radio wave transmittance.

WORKING EXAMPLES

Hereinafter, working examples of the present invention will be described. However, the present invention is not limited to the following working examples.

A. Examination of First Film Region

1. Preparation of Working Examples 1 and 2

As described below, glass bodies according to Working Examples 1 and 2 were formed which include a glass plate and a first film region formed on one surface thereof.

(1) Glass plate: Soda lime glass with a thickness of 6 mm (2) First film region: $SnO_2$, ZnO, Ag, ZnAl, ZnO, Ag, ZnAl, ZnO, and $SnO_2$ were laminated on a glass plate in the stated order to form a Low-E film with a length of 500 mm and a width of 500 mm. The thickness of Ag on the inner side (glass plate side) was 13 nm, and the thickness of Ag on the outer side was 14 nm. Thereafter, a portion of this Low-E film was removed by a laser to form, for example, grid-like gaps as shown in FIG. 3. In this way, the first film region was formed.

As a laser, a YAG laser with a repetition frequency of 30 kHz, a wavelength of 1064 nm, an output of 15 W, and an operating speed of 500 mm/sec was used. In Working Examples 1 and 2, the widths and pitches of the gaps are different. That is, in Working Example 1, the width of the gaps was 80 μm and the pitch of the gaps was 1.0 mm. That is, multiple islands with a side of 1.0 mm were formed. On the other hand, in Working Example 2, the width of the gaps was 30 μm and the pitch of the gaps was 0.3 mm. That is, multiple islands with a side of 0.3 mm were formed.

2. Preparation of Working Examples 3 to 5

As described below, glass bodies according to Working Examples 3 to 5 were formed which include a glass plate and a first film region formed on one surface thereof.

(1) Glass plate: Soda lime glass with a thickness of 6 mm (2) First film region: $SnO_2$, ZnO, Ag, ZnAl, ZnO, and $SnO_2$ were laminated on a glass plate in the stated order to form a Low-E film. The thickness of Ag was 10 nm. Thereafter, a portion of this Low-E film was removed by a laser to form, for example, grid-like gaps as shown in FIG. 3. In this way, the first film region was formed.

As the laser machining conditions of Working Examples 3 to 5, machining was performed with a YAG:Nd laser at a repetition frequency of 100 kHz, a wavelength of 355 nm, and an operation speed of 300 mm/sec. In Working Examples 3 to 5, the gap width was 10 μm, and the gap pitch was changed. That is, in Working Example 3, a plurality of islands having a gap width of 10 μm and a side of 0.9 mm were formed. In Working Example 4, a plurality of islands having a gap width of 10 μm and a side of 0.5 mm were formed. In Working Example 5, a plurality of islands having a gap width of 10 μm and a side of 0.2 mm were formed.

3. Preparation of Comparative Examples 1 to 3

The glass plates used in Comparative Examples 1 to 3 are the same as those in Working Examples 1 and 2. In Comparative Example 1, a second film region having a Low-E film with the same dimension and material as in Working Examples 1 and 2 was formed on this glass plate. That is, a second Low-E film, which is a continuous film with no gap formed therein, was formed. In Comparative Example 2, a second film region having a Low-E film with the same dimension and material as in Working Examples 3 to 5 was formed on a glass plate. That is, a second Low-E film, which is a continuous film with no gap formed therein, was formed. In Comparative Example 3, a glass body having only a glass plate was used.

4. Evaluative Tests

The following evaluative tests were performed on Working Examples 1 to 5 and the Comparative Examples.

(1) Visible Light Transmittance

The transmission spectrum was measured using a spectrophotometer (U4100 manufactured by Hitachi Corporation), and the visible light transmittance was calculated according to JIS-R3106.

(2) Emissivity

Measurement was performed according to JIS-R3106 using a Fourier transform infrared spectrophotometer (Frontier Gold manufactured by Perkin Elmer Corporation). Note that the optical characteristics of the first Low-E films of Working Examples 1 and 2 were set to the average value of the incident light emission range including the islands and gaps.

(3) Thermal Transmittance

Based on the results of the measured photothermal characteristics, the thermal transmittance in the multilayer glass panel shown in FIG. 1 above was calculated. That is, the first glass plate and the Low-E film of the multilayer glass panel in FIG. 1 were replaced with the glass bodies of Working Examples 1 and 2 and the Comparative Examples. At this time, the thickness of the first glass plate and the second glass plate was 6 mm, the thickness of the void layer was 12 mm, and the first glass plate was on the outdoor side. Also, calculation was performed under the conditions that the Low-E film was formed on the void layer side of the first glass plate and the void layer was air.

(4) Radio Wave Transmission Characteristics

The radio wave transmission characteristics of the glass bodies of Working Examples 1 and 2 and the Comparative Examples were measured, and the propagation loss (dB) compared with that of the glass plate without the Low-E film was evaluated under the following conditions. That is, the propagation loss of the glass plate without the Low-E film was set to 0 dB for comparison.

Frequency band: 3.7 GHz

Installation angle of glass plate: 90 degrees, perpendicular to the ground.

Distance between glass and transmission antenna: 50 mm

Distance between glass and reception antenna: 50 mm

Reflection waves other than direct waves of transmission and reception were erased.

The results are as follows.

TABLE 1

| | Visible light transmittance (%) | Low-E surface emissivity | Thermal transmittance ($W/m^2K$) | Radio wave propagation loss (dB) *compared to glass without film | Width of gaps (μm) | Maximum dimension of islands (mm) |
|---|---|---|---|---|---|---|
| Work. Ex. 1 | 78 | 0.15 | 1.9 | 4 dB | 80 | 1 |
| Work. Ex. 2 | 79 | 0.16 | 1.9 | <1 dB | 30 | 0.3 |
| Work. Ex. 3 | 67 | 0.14 | 1.9 | <1 dB | 10 | 0.9 |
| Work. Ex. 4 | 68 | 0.16 | 1.9 | <1 dB | 10 | 0.5 |
| Work. Ex. 5 | 69 | 0.21 | 2 | <1 dB | 10 | 0.2 |

TABLE 1-continued

| | Visible light transmittance (%) | Low-E surface emissivity | Thermal transmittance ($W/m^2K$) | Radio wave propagation loss (dB) *compared to glass without film | Width of gaps (μm) | Maximum dimension of islands (mm) |
|---|---|---|---|---|---|---|
| Comp. Ex. 1 | 76 | 0.02 | 1.6 | 36 dB | No gap (solid film) | |
| Comp. Ex. 2 | 67 | 0.11 | 1.8 | 29 dB | No gap (solid film) | |
| Comp. Ex. 3 | 89 | 0.84 | 2.8 | — | — | |

As shown in Table 1 above, it was found that in Comparative Examples 1 and 2, since the second film region without gaps was formed, the radio wave propagation loss was high and it was difficult to transmit and receive radio waves. On the other hand, in Working Examples 1 to 5, it was found that the radio wave propagation loss was low and it was relatively easy to transmit and receive radio waves (e.g., 5G frequency band) of mobile phones and the like.

Also, when Working Examples 1 and 2 and Comparative Example 1 or Working Examples 3 to 5 and Comparative Example 2 were compared, there was almost no difference in the visible light transmittance, and for example, it was favorable as window glass. Although the emissivity of Working Examples 1 and 2 was higher than that of Comparative Example 1, the difference in the thermal transmittance was small. Also, although Working Examples 3 to 5 also had higher emissivity than Comparative Example 2, the difference in the thermal transmissivity was small, and the thermal transmissivity was lower than that of Comparative Example 3 in which the Low E film was not formed. Accordingly, for example, it was found that a sufficient heat insulating performance can be obtained even by using a multilayer glass panel in which the first film region is formed on the entire surface as in Working Examples 1 to 5.

B. Examination of Gaps

1. Preparation of Working Examples 6 to 8

The glass bodies of Examples 6 to 8 were produced as follows. First, soda lime glass with a thickness of 6 mm was prepared as a glass plate. Next, $SnO_2$, ZnO, Ag, ZnAl, ZnO, and $SnO_2$ were laminated on a glass plate in the stated order as the first film region to form a Low-E film having a thickness of about 80 nm, a length of 150 mm, and a width of 300 mm. $SnO_2$ and ZnO laminated on the glass plate correspond to the base layer. Then, a portion of this Low-E film was removed by a laser to form gaps. Note that as the laser, a YAG laser with a repetition frequency of 100 kHz, a wavelength of 355 nm, and an operating speed of 300 mm/sec was used.

In Working Example 6, the width of the gaps was 10 μm, and in Working Examples 7 and 8, the width of the gaps was 18 μm. However, in Working Examples 6 and 7, each layer of the Low-E film was removed by a laser so as to leave the base layer (about 45 to 55 nm was removed from the surface of the Low-E film). That is, the base layer was exposed to the outside. On the other hand, in Working Example 8, the Low-E film was completely removed, and a portion of the glass plate was also removed.

2. Evaluation

Figure 7:
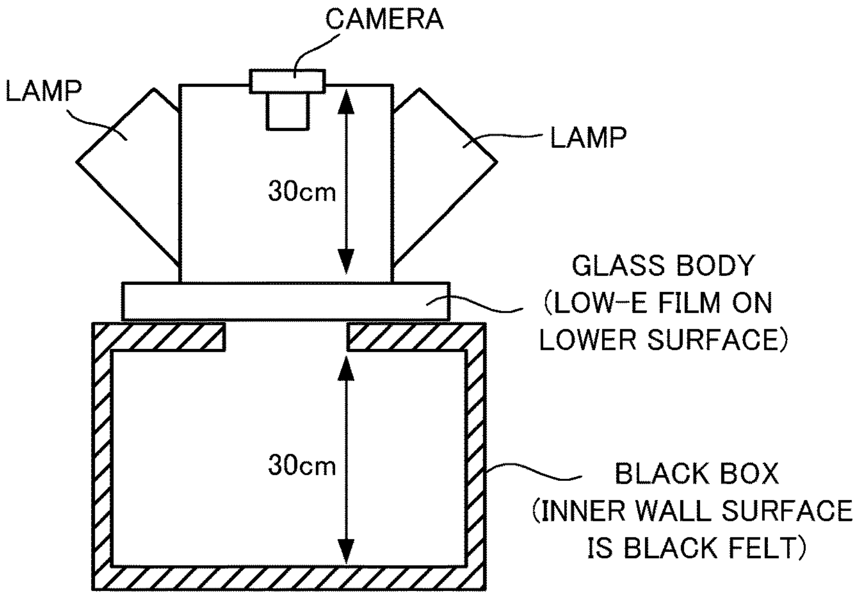
FIG. 7 is a diagram showing an image capture device.

The gaps of Working Examples 6 to 8 were imaged using an image capture device shown in FIG. 7. In the device of FIG. 7, an opening was formed in the upper portion, and a glass body was placed on a box having a hollow interior with the first film region facing downward. Then, an image capture box was placed on the upper surface of the glass body. In the image capture box, a camera was placed 30 cm above the glass body, and light was emitted from two locations diagonally above the glass body by lamps (27W fluorescent lamp Paralite Flat FML27EX-N (daylight white) manufactured by Hitachi Corporation). The shooting conditions were an F value of 3.5, a shutter speed of 1/10 second, and an ISO sensitivity of 100. The results are as shown in FIG. 8.

Figure 8:
FIG. 8 is a photograph showing the first film regions of Working Examples 6 to 8.
Figure 8:
Figure 8:
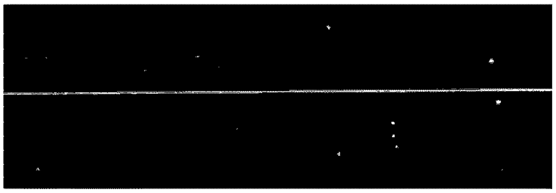

In the photographs shown in FIG. 8, the white line extending in the lateral direction is a gap, and the black is the Low-E film. In Working Examples 6 and 7 in which the base layer remains as gaps, the gaps are not noticeable, and in particular, if the width of the gaps is small, the gaps are even less noticeable. On the other hand, it was found that the gaps of Working Example 8, in which a portion of the glass plate was removed, were somewhat noticeable.

Figure 9A:
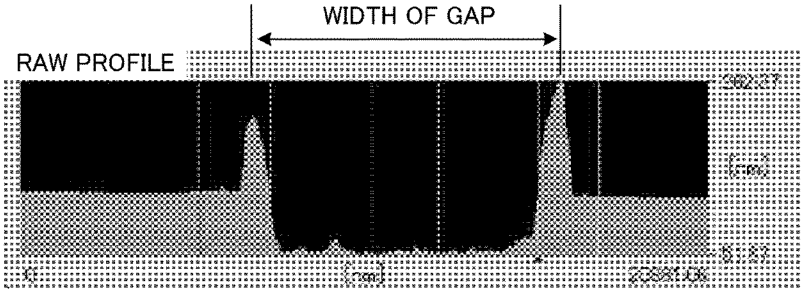
FIG. 9A is a cross-sectional view taken along a width direction of a gap of Working Example 6.
Figure 9B:
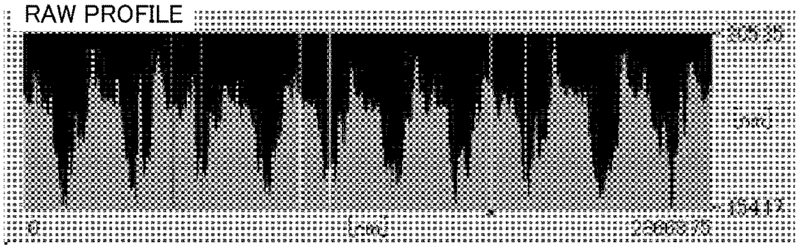
FIG. 9B is a cross-sectional view taken along a length direction of the gap of Working Example 6.
Figure 10A:
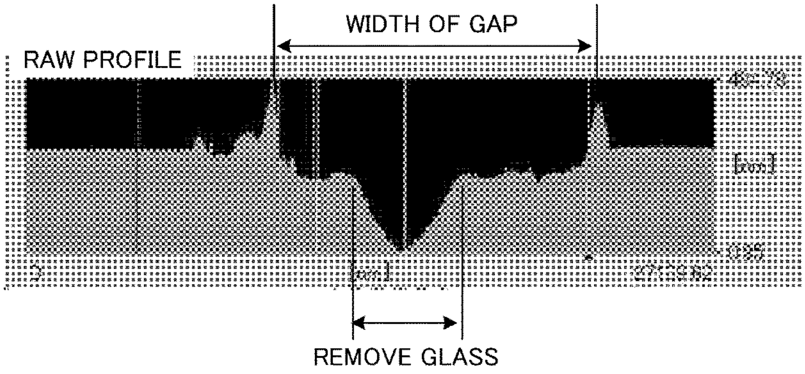
FIG. 10A is a cross-sectional view taken along the width direction of a gap of Working Example 8.
Figure 10B:
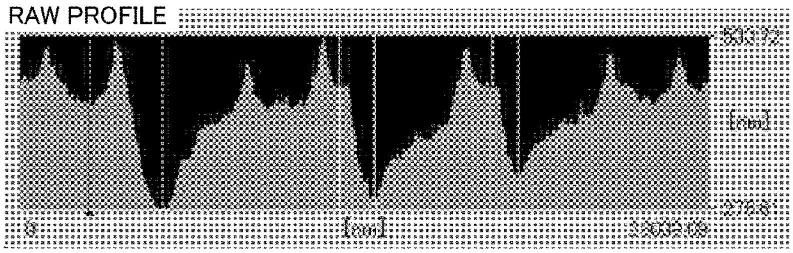
FIG. 10B is a cross-sectional view taken along the length direction of the gap of Example 8.

Furthermore, the gaps in Working Examples 6 and 8 were observed using an atomic force microscope (AFM). FIG. 9A is a cross-sectional view taken in the width direction of the gap in Working Example 6, FIG. 9B is a cross-sectional view taken in the length direction of the gap in Working Example 6, FIG. 10A is a cross-sectional view taken in the width direction of the gap in Working Example 8, and FIG. 10B is a cross-sectional view taken in the length direction of the gap in Working Example 8. As shown in FIG. 9A, in Working Example 6, the bottom surface of the gap is formed substantially flat. Furthermore, the height difference of the recesses and protrusions of the base layer in the length direction of the gap shown in FIG. 9B was measured and found to be 19 to 27 nm. If a gap has such a profile, it will not be noticeable as described above, and therefore, for example, in view of the height difference of the recesses and protrusions of the base layer, it was found that the surface roughness Rmax is preferably 50 nm or less. In this example, since the bottom surface of the gap is approximately flat, the scatter amount of incident light is small, and it is thought that the gap is not noticeable.

On the other hand, as shown in FIG. 10A, in Working Example 8, a portion of the glass is removed, and FIG. 10B is a cross-section taken along the surface of the removed glass in a gap. When the height difference of the recesses and protrusions of the base layer in the length direction of the gap shown in FIG. 10 was measured, it was 126 to 153 nm. It was found that if the gap had such a profile, it would be noticeable as described above. In this example, since the bottom surface of the gap is formed by scraping the glass plate so as to be recessed downward, it is thought that the recessed portion of the bottom surface increases the scatter amount of light and the gap tends to be noticeable.

C. Examination of Position of Antenna Region

Figure 11A:
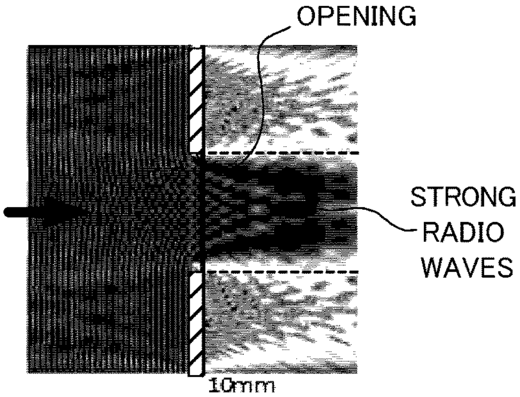
FIG. 11A is a diagram showing a result of simulating radio waves passing through an opening.
Figure 11B:
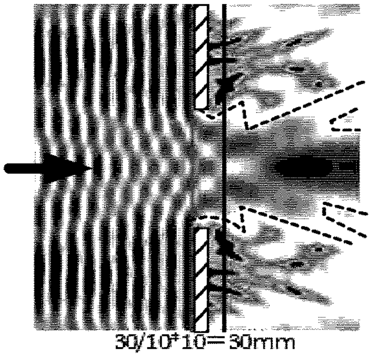
FIG. 11B is a diagram showing a result of simulating radio waves passing through an opening.
Figure 12A:
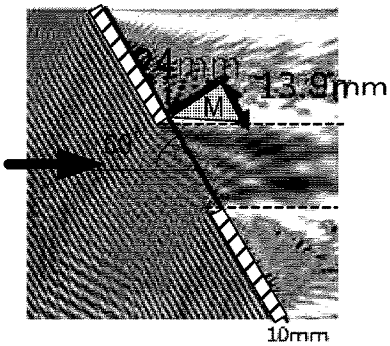
FIG. 12A is a diagram showing a result of simulating radio waves passing through an opening.
Figure 12B:
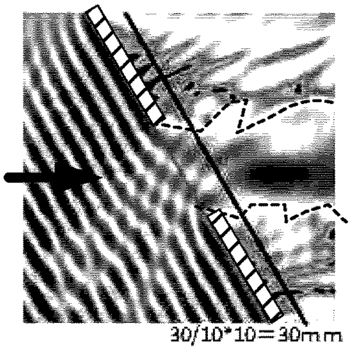
FIG. 12B is a diagram showing a result of simulating radio waves passing through an opening.
Figure 13A:
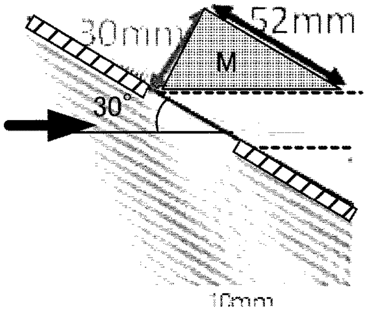
FIG. 13A is a diagram showing a result of simulating radio waves passing through an opening.
Figure 13B:
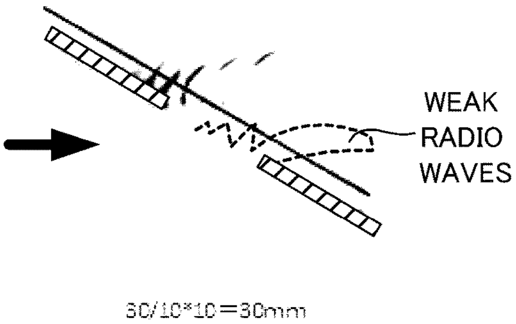
FIG. 13B is a diagram showing a result of simulating radio waves passing through an opening.

A simulation was performed using a shielding plate with an opening of 100 mm×100 mm through which radio waves can pass. This opening assumes the first film region. As described above, the first film region has a first Low-E film partitioned by gaps, but according to the present inventor, the entire first film region can be evaluated as a region through which radio waves pass, regardless of the number of gaps and the like, and therefore the simulation was performed here assuming that the opening through which radio waves can pass is the first film region. This point is the same in Study D, which will be described later. A simulation was performed in which radio waves of 30 GHz and 10 GHz were emitted to this shield plate. Also, the irradiation angles of radio waves with respect to the shield plate were set to 90°, 60°, and 30°. This simulation was performed using the electromagnetic field simulator Micro-Stripes 2. FIG. 11A is a diagram showing the distribution of radio waves obtained by emitting 30-GHz radio waves at 90°, and FIG. 11B is a diagram showing the distribution of radio waves obtained by emitting 10-GHz radio waves at 90°. FIG. 12A is a diagram showing the distribution of radio waves obtained by emitting 30-GHz radio waves at 60°, and FIG. 12B is a diagram showing the distribution of radio waves obtained by emitting 10-GHz radio waves at 60°. FIG. 13A is a diagram showing the distribution of radio waves obtained by emitting 30-GHz radio waves at 30°, and FIG. 13B is a diagram showing the distribution of radio waves obtained by emitting 10-GHz radio waves at 30°. In these diagrams, the radio waves are emitted in the direction of the arrows. Also, the region surrounded by the dotted line shows the distribution of strong or weak radio waves.

According to FIGS. 11 to 13, it can be understood that the radio waves travel straight in the direction of the arrow after passing through the opening. In particular, it can be understood that the high-frequency 30-GHz radio waves have higher straightness than the low-frequency 10-GHz radio waves. It can be understood that the low-frequency 10-GHz radio waves spread slightly after passing through the opening.

Also, since the 30-GHz radio waves have high straightness, for example, if the radio waves are emitted diagonally as shown in FIGS. 12A and 13A, the radio waves do not reach much in the triangular region M after passing through the opening.

According to the above description, it was found that it is preferable to provide the antenna region at a position corresponding to the first film region, as shown in FIGS. 4 to 6, especially for 5G radio waves. Also, if the radio wave is incident diagonally, a region having a weak radio wave intensity such as the above-mentioned region M is generated, and therefore, for example, as shown in FIGS. 5 and 6, the antenna region is preferably provided with a distance L with respect to the corresponding region according to the direction of the radio waves.

FIG. 12A shows that one side of the region M is 24 mm, but this assumes, for example, a glass body with a total thickness of 24 mm (first glass plate: 9 mm, void layer: 6 mm, second glass plate: 9 mm). In this case, it is shown that the intensity of the radio waves in the region from the end portion of the corresponding region to 13.9 mm on the second surface of the second glass plate is weak. On the other hand, FIG. 13A shows that one side of the region M is 30 mm, but this assumes, as an example, a glass body with a total thickness of 30 mm (first glass plate: 9 mm, void layer: 12 mm, second glass plate: 9 mm). In this case, it is shown that the intensity of the radio waves in the region from the end portion of the corresponding region to 52 mm is weak on the second surface of the second glass plate.

According to the above description, based on the results of FIGS. 12A and 13A, the distance L shown in FIGS. 5 and 6 is preferably 10 mm or more, more preferably 20 mm or more, and particularly preferably 50 mm or more.

D. Examination of Size of Antenna Region

Figure 14A:
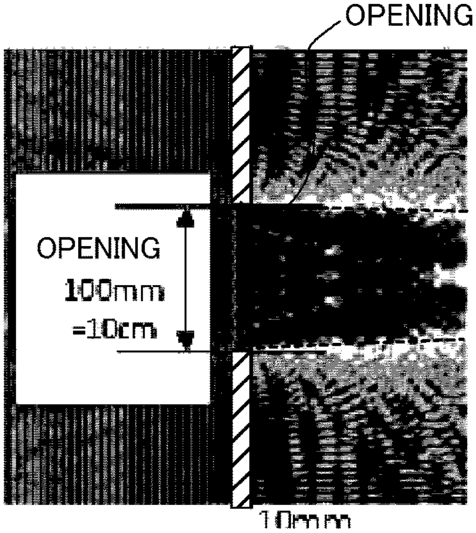
FIG. 14A is a diagram showing a result of simulating radio waves passing through an opening.
Figure 14B:
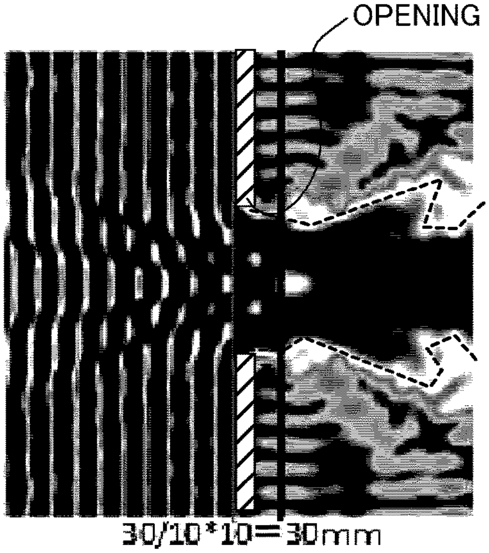
FIG. 14B is a diagram showing a result of simulating radio waves passing through an opening.

A simulation was performed in a manner similar to Study C. At this time, simulations of a case where the size of the opening was 100 mm×100 mm and a case where the size of the opening was 33 mm×33 mm were performed. The results are as shown in FIG. 14. FIG. 14A is the result of a simulation using a 100 mm×100 mm opening (frequency is 30 GHz), and FIG. 14B is the result of a simulation using a 33 mm×33 mm opening (frequency is 10 GHz). As shown in these diagrams, it can be understood that if the size of the opening is small, the radio waves that have passed through the opening spread and the straightness cannot be maintained. Accordingly, it was found that the size of the first film region described above is preferably larger than that of a 33 mm×33 mm rectangle.

LIST OF REFERENCE NUMERALS

1 First glass plate
2 Second glass plate
3 Void layer
41 First film region
411 Gap
412 Island (first Low-E film)
42 Second film region

The invention claimed is:

1. A glass body comprising:
a first glass plate including a first surface and a second surface;
a first film region including a first Low-E film formed on at least a portion of at least one of the first surface and the second surface of the first glass plate;
a second glass plate including a first surface and a second surface; and
a spacer that is arranged between the first glass plate and the second glass plate and forms a void layer between the first glass plate and the second glass plate,
wherein the second surface of the first glass plate and the first surface of the second glass plate are arranged so as to face each other via the void layer,
the first film region has radio wave transmittance in the frequency range of 3.6 to 28 GHZ,
the first film region includes the first Low-E film, which is composed of a plurality of non-continuous islands separated by a plurality of gaps, and
the plurality of the islands have substantially the same size and substantially the same shape.

2. The glass body according to claim 1,
wherein the first Low-E film includes a base layer laminated on the first surface of the first glass plate and a shield layer laminated on the base layer, and
at the gaps, the base layer laminated on the first surface of the first glass plate is laminated and the base layer is exposed.

3. The glass body according to claim 1,
wherein the first Low-E film includes a base layer laminated on the first surface of the first glass plate and a shield layer laminated on the base layer, and the first surface of the first glass plate is exposed at the gaps.

4. The glass body according to claim 1, wherein the maximum dimension of the islands of the first Low-E film, which are partitioned by the gaps, is 100 μm to 5 mm.

5. The glass body according to claim 1, wherein the width of the gaps is 1 to 100 μm.

6. The glass body according to claim 1, wherein the first glass plate further includes a second film region that is formed on the surface on which the first film region is formed, the second film region including a second Low-E film and not having radio wave transmittance.

7. The glass body according to claim 6, wherein the second film region is formed so as to surround the first film region.

8. The multilayer glass panel according to claim 6, wherein the second Low-E film is made of the same material as the first Low-E film, and is continuous, with no gaps.

9. The glass body according to claim 1, wherein the second surface of the second glass plate includes an antenna region in which an antenna is arranged.

10. The glass body according to claim 9, wherein in a view from a direction perpendicular to the first glass plate and the second glass plate, the antenna region is formed with the same size as the region corresponding to the first film region, or is formed smaller than the corresponding region.

11. The glass body according to claim 9, wherein in a view from a direction perpendicular to the first glass plate and the second glass plate, the antenna region is formed with the same size as the region corresponding to the first film region, or at least a side thereof is located inward from an edge portion of the corresponding region.

12. The glass body according to claim 11, wherein 10 mm or more of the at least one side of the antenna region is located 10 mm or more inward from the edge portion of the corresponding region.

13. The glass body according to claim 1, wherein the first film region is formed larger than a rectangle with a side that is 33 mm.

14. The glass body according to claim 1, wherein the first film region is formed on the second surface of the first glass plate.

15. The glass body according to claim 1, wherein the first Low-E film contains a shield layer containing silver as a main component.

16. The glass body according to claim 15, wherein the shield layer has a film thickness of 5 to 20 nm.

17. The glass body according to claim 1, wherein in the first Low-E film, two shield layers containing silver as a main component are laminated.

* * * * *